April 16, 1929.  C. DUMBLETON  1,709,526
BAKING OVEN
Filed Nov. 26, 1926   2 Sheets-Sheet 1
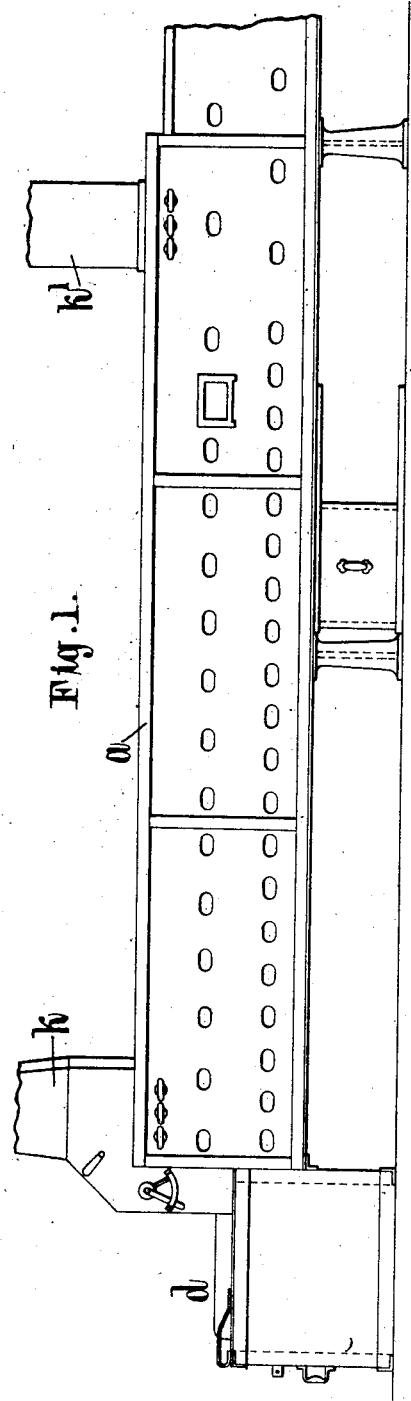
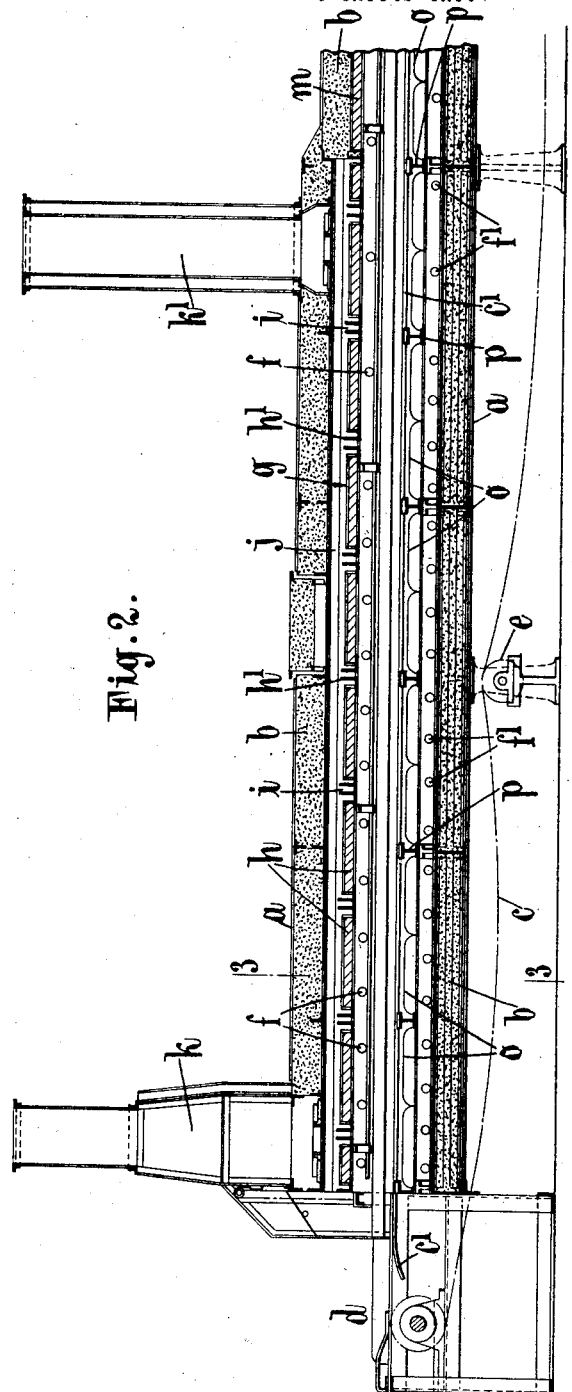
Inventor:
CLAUDE DUMBLETON.
Attorney:

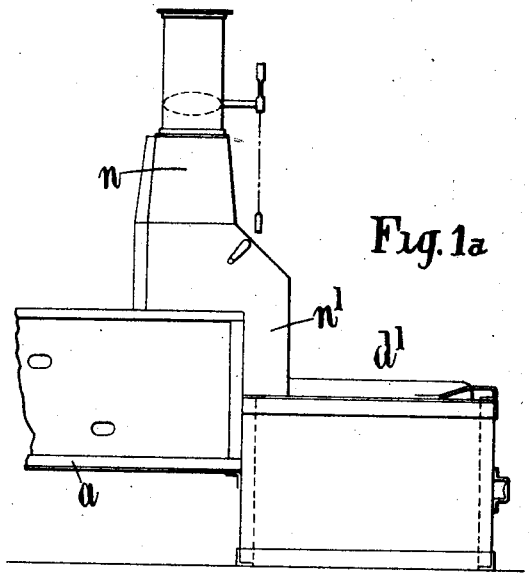
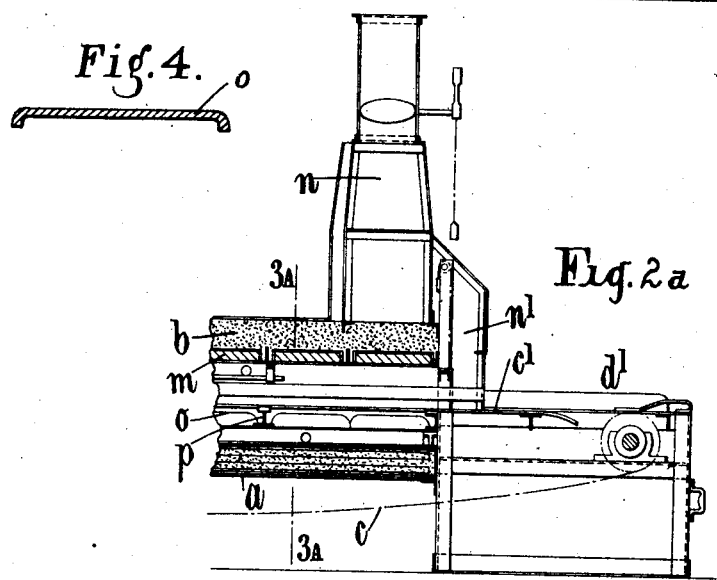
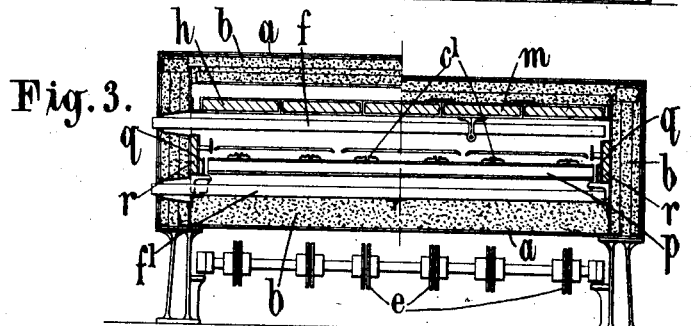

Patented Apr. 16, 1929.

1,709,526

UNITED STATES PATENT OFFICE.

CLAUDE DUMBLETON, OF LONDON, ENGLAND, ASSIGNOR TO BAKER PERKINS COMPANY INCORPORATED, OF NEW YORK, N. Y., A CORPORATION OF NEW YORK.

BAKING OVEN.

Application filed November 26, 1926, Serial No. 150,927, and in Great Britain December 10, 1925.

This invention relates to baking ovens and more particularly to those for baking biscuits of that type known as "travelling" ovens in which the goods to be baked are placed on pans or trays which are carried by an endless conveyor, formed for example of chains, continuously through the oven from the inlet to the outlet thereof.

The primary object of the present invention is to provide means for the extraction of the gases at the point where they are generated, thus avoiding draughts and currents of gases in the oven which interfere with even baking.

This object is accomplished by providing, adjacent the inlet end of the oven and extending for approximately one third the length of the baking chamber, a crown formed of a plurality of spaced heat-radiating elements, the spaces between said elements being at substantial distances apart and forming narrow slits or channels extending across the entire width of the baking chamber and communicating with a flue above the crown, thus permitting the aforesaid gases to escape.

The above construction is distinct from known forms of ovens, in one of which, of the internally heated type, the crown is formed with a large number of small perforations spread over a large area over the whole or part of the length of the baking chamber, and in another of which, of the type heated externally of the baking chamber, a small number of widely spaced central slits or apertures extending only for a short distance across the width of the oven are provided in a radiating crown. In both forms the perforations or slots permit passage of the products of combustion to a flue above the crown.

The invention also comprises a novel form of baffle means between the conveyor and the heating elements located below same, to prevent direct contact of the goods with the flames from said heating elements, and other features of construction and combinations of parts all as hereinafter fully described.

An embodiment of the invention is represented in the accompanying drawings in which Figs. 1 and 1ª jointly represent a side elevation of the oven with part broken away in its length; Figs. 2 and 2ª jointly represent a longitudinal section similarly broken away; Fig. 3 is a cross section, half on line 3—3 of Fig. 2 and half on line 3ᴬ—3ᴬ of Fig. 2ª; and Fig. 4 is an enlarged cross-section of one of the baffles.

The oven comprises a casing $a$ formed double as usual for reception of an insulating material $b$, and the continuous conveyor $c$ passes from the inlet $d$ through the baking chamber within which it is guided by rails $c^1$ to the outlet $d^1$ and thence about guiding pulleys $e$ back to the inlet, being driven through the pulleys adjacent the outlet as customary. The oven is of the internally heated variety, being shown as provided with series of transverse gas burner pipes $f$ $f^1$ arranged respectively above and below the conveyor.

For a distance extending approximately for one third the length of the baking chamber the latter is provided with a crown $g$ formed of tiles, bricks, or other heat-radiating elements $h$ which however are not placed close together but are spaced apart to provide between them narrow transverse channels or outlets $i$. In Fig. 2 of the drawings the tiles are shown as supported by transverse angle irons $h^1$, and the outlet channels $i$ are formed between said irons as slots which extend right across the crown at intervals of about two feet apart. Above said tiles is a flue $j$ into which the gases accumulating in the upper part of the baking chamber pass by way of the channels $i$ and from which they are discharged into the atmosphere through one or more chimneys of which two are shown, viz $k$ and $k^1$, the former quite close to the inlet and the other close to the end of the crown.

Beyond the crown above referred to, the tiles $m$ have no openings between them but the gases escape through a dampered or controlled chimney $n$ communicating with the baking chamber by an exterior flue $n^1$ as customary in this class of oven.

In addition to the above described means of drawing off the gases at the commencement of the baking operation, there are provided means to protect the goods from direct contact with the flames from the lower series of burners $f^1$. These means comprise a series of baffle elements located below the conveyor $c$ and between the latter and the burners, such baffle elements extending for the full length of the baking chamber and suitably consisting of sheet metal plates $o$ of inverted trough section (see Fig. 4) with downwardly curved ends, shown in Fig. 2 as formed in pairs supported upon the bottom flanges of I-irons $p$, this being a convenient method of forming and mounting same. Said baffle plates extend nearly across the width of the baking chamber, leaving however at the sides spaces $q$ through which the gases of combustion from the burners escape and heat the side walls of the baking chamber which, at such points, may appropriately be provided with lining tiles or the like $r$ (see Fig. 3). Such arrangement prevents the cooling of the side walls of the baking chamber whereby the desired heat therein can be maintained. At the part where the flue $j$ is provided, the gases of combustion pass upwards along the sides through the spaces $q$ and out through the channels $i$ between the tiles of the crown to said flue.

What I claim as my invention and desire to secure by Letters Patent of the United States is:—

1. A baking oven having a crown located adjacent the inlet end of the baking chamber and extending for approximately one-third of the length thereof; said crown being formed of a plurality of spaced heat radiating elements, the spaces between which are at substantial distances apart and form channels extending transversely across the entire width of the baking chamber, and a longitudinal flue above said crown with which the aforesaid transverse channels communicate.

2. A baking oven having a crown located adjacent the inlet end of the baking chamber and extending for approximately one-third of the length thereof, said crown being formed of a plurality of spaced heat radiating elements, the spaces between which form transverse channels; a flue above said crown with which said channels communicate, a travelling conveyor on which the goods pass through the baking chamber, a plurality of heating devices disposed below the conveyor, and flame baffling means located between the heating devices and the conveyor; said baffling means comprising imperforate metal plates having downwardly curved ends and extending substantially across the width of the baking chamber, leaving lateral spaces adjacent the side walls of said chamber by which the gases of combustion from the heating devices may pass to the aforesaid channels and through the same to the flue communicating therewith.

3. In a baking oven, a traveling conveyor on which the goods pass through the baking chamber; a plurality of heating devices disposed below said conveyor; a longitudinal series of imperforate metal baffle plates disposed between said heating devices and the conveyor and extending the full length of said chamber; and horizontal supporting beams of I-section arranged in the baking chamber with their lower flanges beneath the baffle plates; said plates being formed in pairs, and having their ends curved downward and supported on the said lower flanges of the I-beams and their side edges spaced slightly from the sides of the baking chamber so as to cause the products of combustion from the heating devices to pass along said sides to heat the same.

In witness whereof I have signed this specification.

CLAUDE DUMBLETON.